United States Patent [19]

Hester et al.

[11] Patent Number: 4,539,836
[45] Date of Patent: Sep. 10, 1985

[54] PACKAGE LEAK TESTER

[75] Inventors: Benny L. Hester, Winston-Salem; William H. Graves, Jr., Pfafftown, both of N.C.

[73] Assignee: R. J. Reynolds Tobacco Company, Winston-Salem, N.C.

[21] Appl. No.: 516,872

[22] Filed: Jul. 25, 1983

[51] Int. Cl.³ .............................................. G01M 3/02
[52] U.S. Cl. ........................................ 73/49.3; 73/45.4
[58] Field of Search ................. 73/49.3, 52, 45.3, 45.4, 73/49.2

[56] References Cited

U.S. PATENT DOCUMENTS

| | | | |
|---|---|---|---|
| 900,324 | 6/1908 | Swangren | 73/49.3 |
| 3,369,392 | 2/1968 | Christensson | 73/49.2 |
| 3,462,996 | 8/1969 | Frank | 73/49.2 X |
| 4,118,972 | 10/1978 | Goeppner et al. | 73/49.2 X |

FOREIGN PATENT DOCUMENTS 58-30635  2/1983  Japan .................................. 73/49.2

Primary Examiner—Gerald Goldberg
Assistant Examiner—Joseph W. Roskos
Attorney, Agent, or Firm—Joseph E. Root, III

[57] ABSTRACT

A method and apparatus for testing packages for leaks. Selected values of suction and positive pressure are supplied to a testing position, which may be a test head. A package to be tested is held in the testing position by the suction, and positive pressure is introduced into the package through a puncture, which may be made before or after the package is placed in position. Values of suction and positive pressure are chosen such that a package meeting leakage specifications will contain sufficient positive pressure to overcome the suction, causing the package to be ejected from the testing position. If the package does not meet specification, leakage will cause the suction to hold the package in position. Thus, a rapid and visible indication of package quality is provided.

11 Claims, 6 Drawing Figures

PACKAGE LEAK TESTER

BACKGROUND OF THE INVENTION

This invention relates to the art of detecting leaks in packages, and more particularly to a method and apparatus for automatically determining whether a package falls within acceptable leakage parameters.

Most perishable goods are packaged in some form of sealed container to provide acceptable shelf life. Some means for testing package integrity must be included in the manufacturing process to insure product quality.

Package integrity is particularly important to the cigarette industry. After cigarettes are assembled into a pack—generally, either a soft paper package or cardboard box, both having a foil inner liner—the pack is sealed within a moisture-proof polypropylene wrapper. Moisture loss is the single most important determinant in shelf life, so it is important that manufacturers be able to determine whether the polypropylene wrapper is completely sealed. Lacking the ability to make rapid and accurate package integrity determinations, manufacturers must choose between an overly conservative product rotation policy or the possibility of consumer dissatisfaction with cigarettes which have become "stale" through moisture loss.

The generally accepted method for testing package integrity falls far short of the goals of reliability or rapidity. Primary reliance is placed upon visual inspection; given that the overwrap is transparent and that the production line is moving rapidly, the hazards of relying entirely upon visual inspection are glaringly obvious. The present method of physically testing package integrity is both cumbersome and potentially hazardous. The test instrument consists of a mercury bath with a wire mesh fixture in the shape of a cigarette pack, protruding above the bath. A vacuum line is located within the fixture, above the surface of the mercury. The pack to be tested is carefully slit in half and the polypropylene wrapper removed. The wrapper is then placed over the wire mesh fixture such that its open end extends into the mercury bath. The chamber thus defined by the wrapper and the mercury surface is then evacuated via the vacuum line, and the ability of the wrapper to sustain a selected vacuum level is measured. Plainly, this method is both slow and labor-intensive. Additionally, it is inherently incapable of providing rapid information feedback, as the potential hazard in locating an open mercury bath within a production area is amply documented. Clearly, the cigarette industry needs a rapid and reliable means for testing package integrity.

The package testing art does not offer a suitable alternative to the present method. For example, U.S. Pat. No. 4,118,972, to Goeppner, discloses a device which requires that the package be evacuated and then surrounded by an inert gas, such as helium. Apparatus connected to the evacuation means then detects the amount of the gas penetrating into the package as an indication of the leakage rate. Another system, seen in Westervelt, U.S. Pat. No. 3,872,712, relies upon the timed application of compressed air, at several pressure levels, in conjunction with somewhat elaborate control and measurement apparatus, to measure leakage.

The complexity of such devices has led manufacturers of mass-produced consumer goods to abandon the idea of direct, on-line, measurement of package leakage. Rather, these manufacturers usually rely upon indirect methods, such as visual inspection of the package seal, or off-line methods, like the inert gas atmosphere system described above.

SUMMARY OF THE INVENTION

The broad object of the present invention is to provide a rapid and reliable apparatus and method for testing package integrity.

Another object of this invention is to provide package testing apparatus which can provide test results in a straightforward, single-step process.

Yet another object of the present invention is to provide package testing apparatus capable of operation in proximity to production equipment.

A further object of this invention is to provide package testing apparatus that can be operated by production equipment operators having no specialized training.

Another object of this invention is to provide package testing apparatus having no associated environmental hazards.

These and other objects are accomplished by the present invention, which takes advantage of the fact that a properly sealed package can withstand a given internal pressure without rupturing the package seals. Generally, the invention includes a test head, having furnished to it sources of negative and positive pressure. The negative pressure holds the tested package on the head while positive pressure is introduced into the package. Based upon the integrity criteria established for the particular package, the negative pressure level is adjusted to hold the package on the head unless the applied positive pressure exceeds specification limits. Thus, if the package does not meet specification, the seals will rupture, positive pressure will escape, and the package will specification, the positive pressure will eject the package from the head. The operator simply places the pack to be tested upon the test head; if the package pops off within the established time limit, the package is acceptable; if not, the package is defective.

BRIEF DESCRIPTION OF THE DRAWINGS

FIG. 6 is a block diagram of an automated testing apparatus embodying the present invention.

DETAILED DESCRIPTION OF A PREFERRED EMBODIMENT

Figure 1:
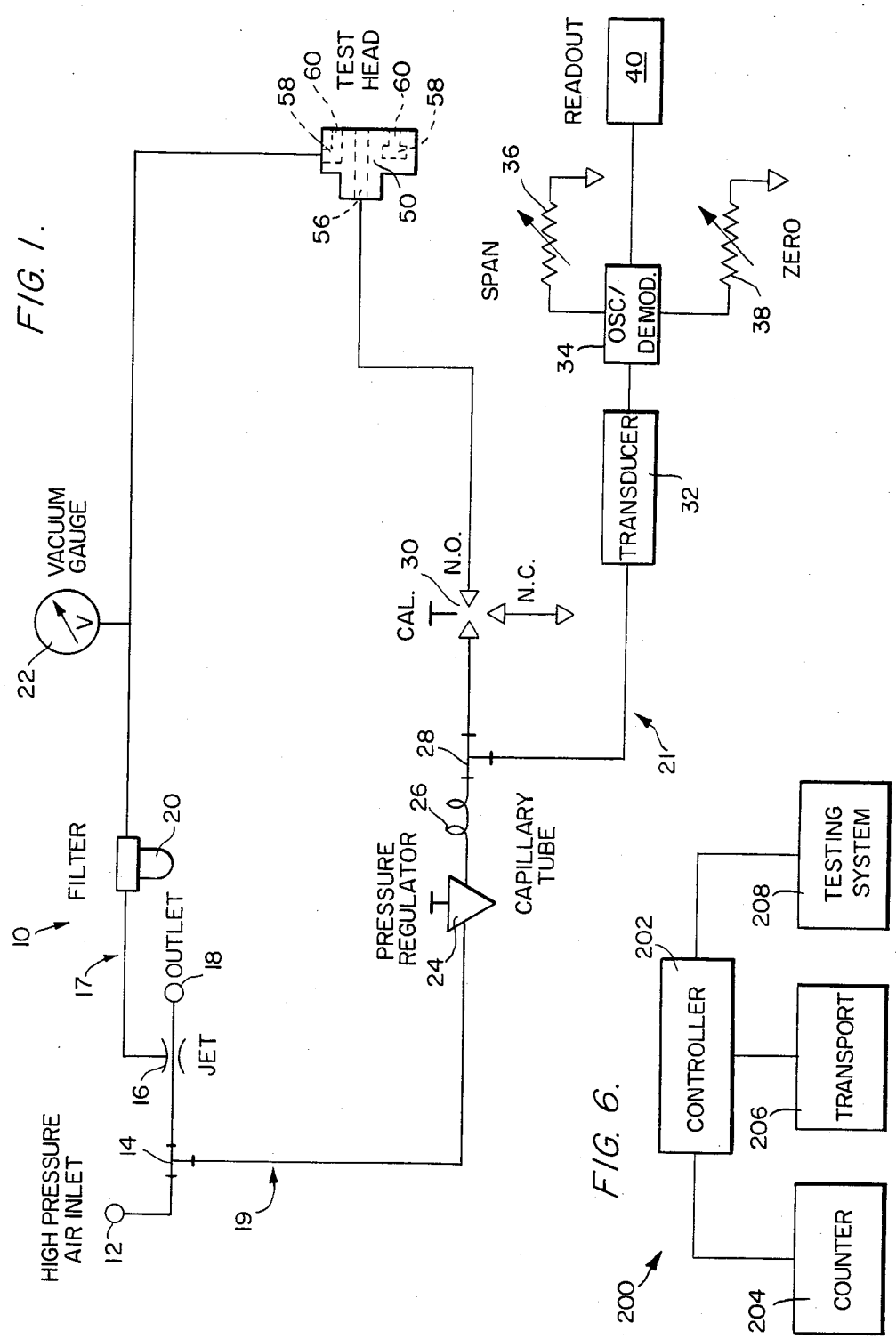
FIG. 1 is a schematic of an embodiment of the present invention.

An embodiment 10 of the present invention, adapted to test cigarette packages, is shown in FIG. 1. Generally, the apparatus can be seen as a vaccum system and a pressure system, both feeding a test head. The components may be mounted in any convenient manner, such as the cabinet shown in FIG. 4, as hereafter explained.

High pressure air is fed to the apparatus via inlet 12. Compressed air sources, normally available in an industrial facility at about 60 psi. may be used. A tee 14 splits the airflow in two directions. In one direction, air flows through a jet 16 to produce a vacuum in vacuum line 17. A convenient component is Ultra-Vac Model 143, readily available to the art. After flowing through the jet, high pressure air is vented to the atmosphere through outlet 18.

The jet creates a negative pressure in vacuum line 17, which communicates this negative pressure to vacuum ports 60, located on test head 50, as explained below. A gauge 22 measures the vacuum present on the line, and filter 20 removes dust and debris from the flow to prevent clogging the jet.

Pressure line 19 also flows from tee 14. Pressure is set by a regulator 24, which may be a Fairchild-Kendall Model 30 or similar component. A capillary tube 26 introduces a selected pressure drop into the line. This tube may be fabricated of stainless steel tubing, having an outside diamter of. 0.062 in. (1.6 mm), a wall thickness of 0.020 in. (0.5 mm), about 8 inches (203.2 mm) long.

A measurement and control system 21 is fed off the pressure line through tee 28. The pressure present in the line is sensed by transducer 32. Oscillator/demodulator 34 develops an electrical signal proportional to the pressure and feeds it for display to readout device 40. The span and zero points of the oscillator/demodulator are set by potentiometers 36 and 38. Appropriate components for this system are a Validyne Model DP 15 transducer and Validyne Model CD 101 oscillator/demodulator and a Newport Electronics Model 400AS-4 LED readout meter, all available to the art.

Calibration switch 30 is located immediately downstream from tee 28. This device is a pushbutton switch shifting one inlet between two outlets. The normally open outlet is connected to the central bore 56 of test head 50. The normally closed outlet is closed off, as explained hereafter.

Figure 2:
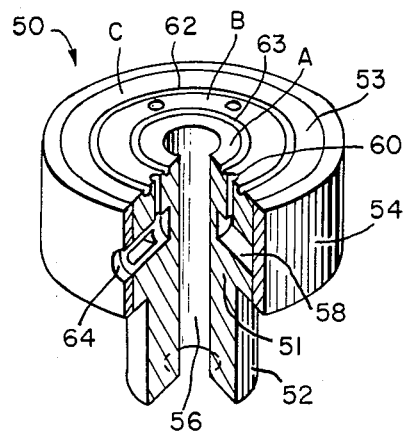
FIG. 2 is a pictorial of the test head employed in the embodiment of FIG. 1, cutaway to show internal construction.

Test head 50 is shown in detail in FIG. 2. The configuration and size of the test head is adapted to the package being tested. Here, because cigarette packages can be moved to the test device easily, the test head is positioned in a stationary mounting. For other packages, the test head could be incorporated into a hand-held device, connected to the remainder of the system through flexible lines. Convenience and speed of operation are the primary criteria for selecting between alternatives of head design.

The test head selected for this embodiment is in the form of a solid cylinder of high-density polyethylene or other suitable material, having upper and lower portions 51 and 52. The lower portion has a diameter about half that of the upper portion, and comprises approximately half the length of the cylinder. The upper face of the cylinder forms the surface upon which packages are tested.

A central bore 56 extends the length of the test head, and is tapped at its lower end to receive a suitable fitting for connection to the pressure line. A manifold 58 lies within the upper portion of the head, extending circumferentially around it. This manifold may be formed conveniently by cutting a transverse slot in the center of the upper portion, extending inwardly toward, but not communicating with, the central bore. The manifold may then be sealed by placing a ring 54 around the outer periphery of the upper portion, held in place by press fit or an appropriate adhesive. A vacuum inlet 64 extends from the outer periphery of the ring transversely into the head to communicate with the manifold. This inlet is tapped to receive a suitable fitting for connection to the vacuum line.

O-rings 62 are secured to the testing surface to define three concentric areas, centered on the central bore. An inner O-ring 63 encloses the central bore to define a high pressure area A. The outer O-ring 62 defines a vacuum area B between it and the inner O-ring. Area C, lying outside the outer O-ring is at ambient pressure. Vacuum ports 60 communicate between area B and the manifold. These ports are sufficient in size and number to exert the desired amount of suction force on the package to be tested, as explained hereafter.

Figure 3:
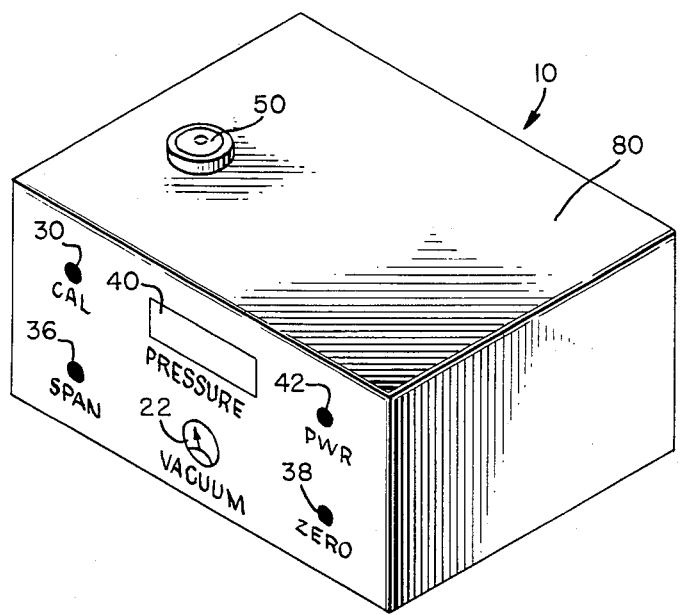
FIG. 3 is a pictorial of the embodiment of FIG. 1, mounted in a cabinet.

The components of the embodiment 10 may be mounted conveniently in a cabinet 80, shown in FIG. 3. For ease of operation, the test head 50 is mounted on the top surface of the cabinet, slightly protruding above it. The cabinet's front panel displays the status of the pressure line at meter 40 and the vacuum line at gauge 22. Control over the oscillator/demodulator is provided by span and zero controls 36 and 38. The calibration switch 30 also is located on the front panel, as is a power switch 42.

Figure 4:
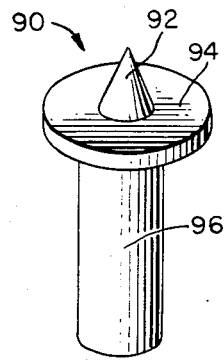
FIG. 4 is a pictorial of the punch used in the embodiment of FIG. 1.

Testing of a package requires that pressure be introduced into the package through an opening. A convenient tool 90 for providing such an opening is shown in FIG. 4. A point 92, mounted on a flange 94 provides puncturing means, and grip 96 permits hand operation by the person performing the test. The depth and size of the hole are regulated by the dimensions of point 92.

Although the embodiment shown employs a hand-operated puncturing means, automated puncturing means could be employed if desired. For example, in a larger system an automatically-activated puncturing probe could be carried within the central bore of the testing head. The details of such modification would be apparent to those having skill in the art.

Figure 5:
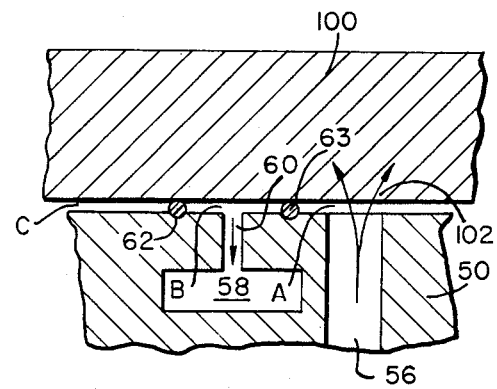
FIG. 5 is a detail sectional view of the embodiment of FIG. 1, illustrating the operation of the apparatus.

Operation of this embodiment can best be seen in FIG. 5. Before a package is placed on the test head 50, air flows out of the central bore 56 from the pressure system, and the vacuum system causes air to flow into the vacuum ports 60 to the manifold 58. A cigarette package 100 is punctured with tool 90 (FIG. 4), which forms a hole 102. The pack is then placed on the test head with the hole directly over the central bore. The surface of the package bears against O-rings 62 and 63, sealing area B so that the vacuum system exerts a suction force on the pack to hold it in position. Meanwhile, the pressure system forces air out the central bore, through the hole 102 and into the interior of the package. Pressure inside the cigarette package rises, stressing the seals. If the seals meet specification, and no holes exist in the overwrap, the pressure exerted by the column of air coming through the central bore will rise until it exceeds the negative pressure exerted by the vacuum system. When the positive pressure in area A exceeds the negative pressure in area B, the package will be ejected from the test head. If the seals or the overwrap do not meet specification, the pressure inside the package will never rise to the point where the pressure exerted in area A can overcome the suction exerted in area B, and the pack will remain in place. Thus, the operator has a rapid and easy identification of package quality: if the pack pops off the test head, it is acceptable. If it does not, if fails the test.

Many of the specific design criteria of the test head depend upon the package specification. Based upon that specification, one skilled in the art can calculate the relative pressures needed in areas A and B to test the package. In the system shown, the desired suction is achieved when negative pressure in the vacuum system equals 19 inches (482.6 mm) water. Given a spacing between the inner and outer O-rings of about 1/16th inch (1.6 mm) and four vacuum ports, the required suction force is exerted on a cigarette package.

Pressure in the pressure system is set by using the pressure regulator, operating through the capillary tube. The readout can be properly set by establishing the zero and "open" conditions. The former is established by using the calibration switch 30. When that switch is depressed, the pressure line has no outlet; using span control 36, the system then can be set for the highest possible system pressure. With the calibration switch in normal position, and with no object over the test head, the zero control 38 is adjusted to show zero pressure in the system.

As can be seen readily, this system is eminently suitable for operation in proximity to production equipment. After simply setting the span and zero controls to their proper level, the operator may proceed to check pack leakage by selecting test packs according to a sampling plan, quickly puncturing each pack and placing it on the test head. Within a matter of seconds, the operator receives a positive indication of quality; the pack either pops off, and is thus acceptable, or it remains in place to show that it has failed the test. In comparison with existing test systems, this invention allows real-time testing of pack leakage for the first time.

Also, the present invention could be incorporated into an automated system, as shown in the block diagram of FIG. 6. At the heart of such a system would be a controller 202, which could be a stand-alone microprocessor-based programmable controller or a portion of a larger computer system. This device would be programmed to accept input from other devices, make decisions, and issue commands. A primary input device is the counter 204, which monitors the production line to determine how many packages are produced. This device could operate in any of several ways known to the art, such as by a photoelectric sensor. Based upon the pre-programmed sampling plan, the controller monitors the number of packages counted by the counter, and when the pre-selected number is reached, it causes the transport 206 to extract one package from the production flow. The transport moves this package to the testing area of testing system 208. For example, this device could be an articulated arm which lifts a cigarette package out of the production flow to place it on a test head or jig similar to the test head already discussed. Testing system 208 can be, in all material aspects, identical to the embodiment of FIG. 1. For this system, however, an automatic means of puncturing the package, preferably carried within the central bore of the test head, must be included. The transport means can be programmed to hold the pack in position while the package is being punctured and then to release the package during the test cycle. Another feature which must be incorporated into the testing system is some means for automatically determining whether the package has passed the test. Several devices to accomplish this objective will be apparent to those in the art, but one possibility could be a simple photoelectric sensor. This device could detect the presence or absence of the package on the test head after a predetermined number of seconds and transmit an appropriate signal to the controller. Based on that signal, the controller would be programmed to indicate acceptable quality by simply allowing the operation to continue, or it could indicate quality problems by either some visual, audible, or other signal to the operator, or by actually stopping the production equipment. Although specific details of an automated system necessarily are stated broadly, those in the art will be able to adapt the present invention to such a system, with specific design criteria based upon the particular packages to be tested.

As will be understood by those having skill in the art, variations from the embodiment shown can be made within the spirit of the invention. For example, the shape of the test head could be altered to accept packs of different dimensions from those of a cigarette pack. Alternatively, a number of differences could be made in the way the system is mounted or enclosed, again based upon the specific requirements of the goods being produced. This and other variations fall within the scope of the present invention, which is defined solely by the claims appended hereto.

We claim:

1. Apparatus for testing packages for leaks, comprising:
   vacuum means for applying suction to hold the package in a position for testing;
   puncturing means for producing an opening in the package;
   positive pressure means for introducing pressure into the interior of the package through said opening, said pressure being regulated to a selected value relative to said vacuum means such that said positive pressure is elevated over a selected time period to a value in excess of said suction if the package meets leakage specifications, whereby a package meeting said specifications is thereby ejected from said testing position.

2. The apparatus of claim 1, further comprising:
   a test head having a testing position and means for applying said suction and said positive pressure to the pack.

3. The apparatus of claim 2, wherein said test head includes:
   a body having a substantially flat surface thereon;
   a central bore, one end terminating at said flat surface and the other communicating with said pressure means;
   means for communicating said suction to said flat surface; and
   means for defining a suction area adjacent said suction communication means.

4. The apparatus of claim 3, wherein said suction communicating means includes:
   a manifold in communication with said suction means; and
   a plurality of ports extending from said manifold to said flat surface.

5. The apparatus of claims 3 or 4, wherein:
   said means for defining a suction area includes at least two concentric O-rings, defining said suction area therebetween, said suction communicating means communicating with said area; and
   said central bore terminates within the area enclosed by the inner said O-ring.

6. The apparatus of claims 1, 2, or 3, wherein said suction means includes:
   means for generating suction;
   means for communicating said suction to the package; and means for measuring and displaying the valve of said suction.

7. The apparatus of claims 1, 2, or 3, wherein said positive pressure means includes:
   means for regulating said positive pressure to a selected valve; and
   means for communicating said positive pressure from a source thereof to the package.

8. A method for testing packages for leaks, comprising the steps of:
   puncturing the package;
   placing the package adjacent a test head in a testing position, with said puncture oriented toward said head;
   applying suction at a selected valve to hold the package on said testing position;
   introducing positive pressure to the package through said puncture, whereby the package will be ejected from said head if capable of holding sufficient pressure to overcome said suction.

9. A test head for leak testing apparatus, comprising a testing position having substantially flat surface;
   means for applying suction to the package to hold same in said testing position, including:
      means for defining a suction area of said testing position; and
      means for communicating suction between said suction area and a source of source, including a manifold in communication with said suction source and a plurality of ports extending from said manifold to said suction area; and
   means for applying positive pressure to the package.

10. The test head of claim 9 wherein:
    said means for defining a suction area includes at least two concentric O-rings, defining said suction area therebetween, said suction communicating means communicating with said area.

11. Apparatus for automatically testing packages for leaks, comprising:
    means for selecting individual packages for testing;
    means for testing individual packages, including:
       means for applying suction to a package at a selected level of negative pressure;
       means for puncturing the package;
       means for introducing positive pressure to the interior of the package at a selected pressure, such that said pressure within the package stresses the package to a pressure higher than said suction, whereby the package is ejected from said testing position if the package contains said pressure;
       means for sensing the presence or absence of a package in said testing position; and
    control means for sequentially directing the operation of the apparatus and signalling the results of said testing.

\* \* \* \* \*

UNITED STATES PATENT AND TRADEMARK OFFICE
CERTIFICATE OF CORRECTION

PATENT NO. : 4,539,836
DATED : September 10, 1985
INVENTOR(S) : Benny L. Hester and William H. Graves, Jr.

It is certified that error appears in the above-identified patent and that said Letters Patent are hereby corrected as shown below:

Col. 2, line 36:

Rewrite "package will specification, the positive pressure will" to read --package will remain held on the head. If the package does meet specification, the positive pressure will--

Signed and Sealed this

Thirty-first Day of December 1985

[SEAL]

Attest:

DONALD J. QUIGG

Attesting Officer

Commissioner of Patents and Trademarks